(12) United States Patent
Ansems et al.

(10) Patent No.: US 12,655,947 B2
(45) Date of Patent: Jun. 16, 2026

(54) LIGHTING ARRANGEMENT WITH ROD-SHAPED LIGHT GUIDE ELEMENT HAVING PRISMATIC STRUCTURES ON SIDE SURFACE

(71) Applicant: SIGNIFY HOLDING B.V., Eindhoven (NL)

(72) Inventors: Johannes Petrus Maria Ansems, Hulsel (NL); Jan De Graaf, Uden (NL); Michał Jan Horaczek, Best (NL); Ties Van Bommel, Horst (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 18/875,365

(22) PCT Filed: Jun. 12, 2023

(86) PCT No.: PCT/EP2023/065642
§ 371 (c)(1),
(2) Date: Dec. 16, 2024

(87) PCT Pub. No.: WO2023/242116
PCT Pub. Date: Dec. 21, 2023

(65) Prior Publication Data
US 2025/0369575 A1     Dec. 4, 2025

(30) Foreign Application Priority Data
Jun. 16, 2022     (EP) ..................................... 22179359

(51) Int. Cl.
F21K 9/232     (2016.01)
F21K 9/61     (2016.01)
(Continued)

(52) U.S. Cl.
CPC ................ F21K 9/232 (2016.08); F21K 9/61 (2016.08); F21V 7/041 (2013.01);
(Continued)

(58) Field of Classification Search
CPC ... F21K 9/232; F21K 9/61; F21K 9/60; F21K 9/68; F21K 9/23; F21V 7/041
See application file for complete search history.

(56) References Cited

U.S. PATENT DOCUMENTS 5,056,892 A * 10/1991 Cobb, Jr. ................ F21V 5/002
                                                                 359/546
5,363,470 A * 11/1994 Wortman ................ G09F 9/305
                                                                 362/581
(Continued)

FOREIGN PATENT DOCUMENTS

DE     202009002499 U1     4/2009
EP         2399067 A1     12/2011
(Continued)

*Primary Examiner* — Ismael Negron

(57)     ABSTRACT

A lighting arrangement including a light emitting diode (LED) light source, a reflector, and a rod-shaped light guide element between the LED light source and the reflector. The side surface of the light guide element includes a prismatic structure with a cross section perpendicular to the longitudinal axis of the light guide element defining a circumferential saw-tooth profile with at least ten vertices extending in a radial direction of the light guide element.

12 Claims, 4 Drawing Sheets

(51) Int. Cl.

| | | |
|---|---|---|
| *F21V 7/04* | (2006.01) |
| *F21V 8/00* | (2006.01) |
| *F21V 19/00* | (2006.01) |
| *F21V 23/06* | (2006.01) |
| *F21Y 115/10* | (2016.01) |

(52) U.S. Cl.

CPC .......... *F21V 19/0055* (2013.01); *F21V 23/06* (2013.01); *G02B 6/0001* (2013.01); *F21Y 2115/10* (2016.08)

(56) References Cited

U.S. PATENT DOCUMENTS

| 6,031,958 | A | * | 2/2000 | McGaffigan | ........... | G02B 6/001 |
| | | | | | | 362/555 |
| 6,350,041 | B1 | * | 2/2002 | Tarsa | ......................... | F21V 9/20 |
| | | | | | | 362/345 |
| 6,481,882 | B1 | * | 11/2002 | Pojar | ...................... | G02B 6/001 |
| | | | | | | 359/837 |
| 6,796,698 | B2 | * | 9/2004 | Sommers | .................. | F21K 9/23 |
| | | | | | | 362/555 |
| 7,976,206 | B2 | * | 7/2011 | Wu | ......................... | F21K 9/232 |
| | | | | | | 362/555 |
| 8,602,621 | B2 | * | 12/2013 | Li | ...................... | G02B 19/0071 |
| | | | | | | 362/311.06 |
| 8,628,220 | B2 | * | 1/2014 | Boonekamp | ......... | G02B 6/0008 |
| | | | | | | 362/249.02 |
| 8,714,784 | B2 | * | 5/2014 | Luo | .................... | G02B 19/0061 |
| | | | | | | 362/555 |
| 8,882,303 | B2 | * | 11/2014 | Totani | ................... | F21V 17/104 |
| | | | | | | 313/46 |
| 9,702,510 | B2 | * | 7/2017 | Anderson | ............... | F21V 31/04 |
| 2007/0053203 | A1 | * | 3/2007 | Graham | .................... | F21S 9/02 |
| | | | | | | 362/559 |
| 2009/0154167 | A1 | | 6/2009 | Lin |
| 2009/0284982 | A1 | | 11/2009 | Cho |
| 2011/0002139 | A1 | | 1/2011 | Lee |
| 2011/0267836 | A1 | | 11/2011 | Boonekamp et al. |
| 2011/0273900 | A1 | | 11/2011 | Li et al. |
| 2012/0014111 | A1 | | 1/2012 | Welten |
| 2013/0083555 | A1 | | 4/2013 | Chen et al. |

FOREIGN PATENT DOCUMENTS

| JP | 2022526654 | A | 5/2022 |
| WO | 2021087617 | A1 | 5/2021 |

* cited by examiner

150

SR

300

200

100

301

210

LIGHTING ARRANGEMENT WITH ROD-SHAPED LIGHT GUIDE ELEMENT HAVING PRISMATIC STRUCTURES ON SIDE SURFACE

CROSS-REFERENCE TO PRIOR APPLICATIONS

This application is the U.S. National Phase application under 35 U.S.C. § 371 of International Application No. PCT/EP2023/065642, filed on Jun. 12, 2023, which claims the benefit of European Patent application Ser. No. 22/179, 359.9, filed on Jun. 16, 2022. These applications are hereby incorporated by reference herein.

FIELD OF THE INVENTION

The present invention generally relates to lighting arrangements. In particular, the lighting arrangements comprise a rod-shaped light guide element with optimized optical performance.

BACKGROUND OF THE INVENTION

The area of illumination has seen a rapid development with the introduction of new technologies, such as light emitting diodes, LEDs. The area is under continuous transformation and continues to attract attention. Compared to traditional light sources such as incandescent lamps, fluorescent lamps, neon tube lamps, etc., arrangements or devices comprising LEDs provide numerous advantages such as an increased flexibility and control, a more compact design, and/or a reduced power consumption. In particular, traditional light sources are rapidly being replaced by LED-based lighting solutions.

It is further preferred that the LED lighting arrangements provide light which has desirable properties such as e.g. light uniformity, low glare, sufficient color mixing and high comfort for observers, etc.

Light guide systems and/or arrangements have been disclosed in prior art to provide light guiding and color mixing effects. However, these light guide systems and/or arrangements usually have limited tolerance capabilities for the control of color mixing and light distribution. Consequently, due to the influence(s) of e.g. reflection and/or refraction, etc., the light output from the light guide systems and/or arrangements may vary. In turn, this may deteriorate the properties of the emitted light, such as e.g. poor light distribution, higher glare, insufficient color mixing, decreased comfort for observers, etc. Furthermore, the attractiveness of the light guide system and/or arrangement may be deteriorated as a consequence.

Hence, it is an object of the present invention to provide improved lighting arrangements in order to mitigate these shortcomings. In particular, there is a wish to provide a lighting arrangement which may provide a good light uniformity, lower glare, sufficient light mixing, such that the lighting arrangement may provide a desired light emission with optimized optical performance. A filament-kind of appearance is also provided in the present invention.

SUMMARY OF THE INVENTION

In the light of the above, it is of interest to provide alternative lighting arrangements in order to improve their optical performance and lighting effects. These and other objects are achieved by providing a lighting arrangement having the features in the independent claims. Preferred embodiments are defined in the dependent claims.

Hence, according to an aspect of the present invention, there is provided a lighting arrangement. The lighting arrangement comprises a light emitting diode, LED, light source, arranged to emit LED light, a reflector, a rod-shaped light guide element extending along a principal axis, A, the light guide element comprising a first end and a second end, wherein the light guide element is arranged between the LED light source and the reflector, wherein the LED light source is arranged at the first end and the reflector is arranged at the second end, and wherein a side surface of the light guide element comprises a prismatic structure of which a cross section, CS, perpendicular to the principal axis, A, comprises a saw-tooth profile around a circumference of the light guide element with at least 10 vertices extending in a radial direction, $R_a$, of the light guide element, whereby the vertices define edges of the prismatic structure extending parallel to the principal axis, A, and wherein the prismatic structure comprises a surface roughness, SR.

Thus, the present invention is based on the idea of providing a lighting arrangement in which the side surface of the rod-shaped light guide element is provided with a prismatic structure extending along the principal axis and comprising a surface roughness. In other words, due to the features of the lighting arrangement, in particular the rod-shaped light guide element comprising on its side surface a prismatic structure of which a cross section, CS, perpendicular to the principal axis, A, the surface roughness of the prismatic structure disrupts the Total Internal Reflections, TIR, of part of the light emitted from the LED light source which is coupled into and transported via TIR through the rod-shaped light guide element, the lighting arrangement is able to provide sufficient color mixing with a filament-kind of appearance and to prevent glare originating from reflections at the interface between the reflector and the light guide element. By the term "light guide element", it is here meant substantially any element, material, structure, or the like, which is arranged or configured to guide and/or reflect the light emitted from the LED light source during operation.

The lighting arrangement of the present invention is further advantageous in that the prismatic structure comprises a saw-tooth profile around a circumference of the light guide element with at least 10 vertices extending in a radial direction, $R_a$, of the light guide element, whereby the vertices define edges of the prismatic structure extending parallel to the principal axis. Due to this arrangement, the lighting arrangement is able to provide a higher extent of TIR in order to improve color mixing.

According to an embodiment of the present invention, a ratio, R, of a length, L, of the light guide element along the principal axis, A, and a diameter, D, of the cross section, CS, fulfills $R=L/D \geq 4$. Due to this arrangement, the lighting arrangement is enabled to provide a more sufficient color mixing.

According to an embodiment of the present invention, the edges of the prismatic structure are rounded. Due to this arrangement, the manufacturability of the lighting arrangement is improved.

According to an embodiment of the present invention, the light guide element comprises a recess at the second end towards the first end, and wherein the reflector is conical and arranged to be recessed at least partly into the recess. Due to this arrangement, the light uniformity is improved.

According to an embodiment of the present invention, an apex angle, θ, of the conical reflector is in a range from 65° to 85°. Due to this arrangement, the invention is further advantageous in that the lighting arrangement may provide a uniform light distribution.

According to an embodiment of the present invention, the number of vertices is in a range from 20 to 60. With this arrangement, the color mixing is significantly improved.

According to an embodiment of the present invention, the surface roughness has a roughness average value in the range from 0.16 to 0.64 μm. Due to this arrangement, the light uniformity and the filament-kind of appearance is further improved.

According to an embodiment of the present invention, at least part of the second end of the light guide element is not covered by the reflector, wherein a part of the LED light in a range from 8% to 20% is output from the part of the second end of the light guide element which is not covered by the reflector. Due to this arrangement, the light uniformity is further improved.

According to an embodiment of the present invention, the light reflected from the reflector and output from the lighting arrangement is in a range from 15% to 35% of the LED light. With this arrangement, the light uniformity is further improved.

According to an embodiment of the present invention, at least part of the LED light is coupled into the light guide element at the first end as in-coupled light, wherein the light guide element is configured to guide, based on total internal reflection, TIR, at least part of the in-coupled light as guided light to the second end, wherein the reflector is arranged to reflect at least part of the guided light incident on the reflector such that the reflected light is arranged to exit the lighting arrangement. Due to this arrangement, the light is output from most directions of the lighting arrangement, thus the light uniformity is further improved.

According to an embodiment of the present invention, the lighting arrangement comprises an air gap between the second end of the light guide element and the reflector, wherein the light reflected based on TIR at the interface between the air gap and the second end of the light guide element is in a range from 30% to 55% of the LED light. The present invention is further advantageous in that the lighting arrangement may provide a reliable and/or stable output of the light with a uniform light distribution from the lighting arrangement. Consequently, a more appealing light output for an observer is generated from the lighting arrangement during operation.

According to an embodiment of the present invention, 10% to 40% of the LED light is output through the side surface of the light guide element without being reflected by at least one of the reflector and the recess. Preferably, 15% to 28% of the LED light is output through the side surface of the light guide element without being reflected by at least one of the reflector and the recess. The lighting arrangement is hereby enabled to provide a more optimized optical performance such as a light distribution with uniformity, lower glare and a filament-kind of appearance.

According to an embodiment of the present invention, the LED light source comprises at least one first LED arranged to emit white light, at least one second LED arranged to emit red light, at least one third LED arranged to emit at least one of green and yellow light and at least one fourth LED arranged to emit blue light.

It will be appreciated that the lighting arrangement of the present invention may be suitable for use in a number of lighting devices, luminaires, or the like. Thus, the lighting arrangement may be beneficial in substantially any area for illumination purposes.

Hence, according to another aspect of the present invention, there is provided a luminaire. The luminaire comprises an envelope at least partly enclosing the lighting arrangement according to any exemplifying embodiment of the present invention, and a base wherein the base comprises a cap arranged to mechanically and electrically connect the lighting arrangement to a socket of a luminaire. The present embodiment is advantageous in that the luminaire, comprising the lighting arrangement is aesthetically attractive and provides light which has desirable properties such as e.g. light uniformity, low glare, sufficient color mixing and high comfort for observers, etc.

Further objectives of, features of, and advantages with, the present invention will become apparent when studying the following detailed disclosure, the drawings and the appended claims. Those skilled in the art will realize that different features of the present invention can be combined to create embodiments other than those described in the following.

BRIEF DESCRIPTION OF THE DRAWINGS

This and other aspects of the present invention will now be described in more detail, with reference to the appended drawings showing embodiment(s) of the invention.

DETAILED DESCRIPTION

Figure 1:
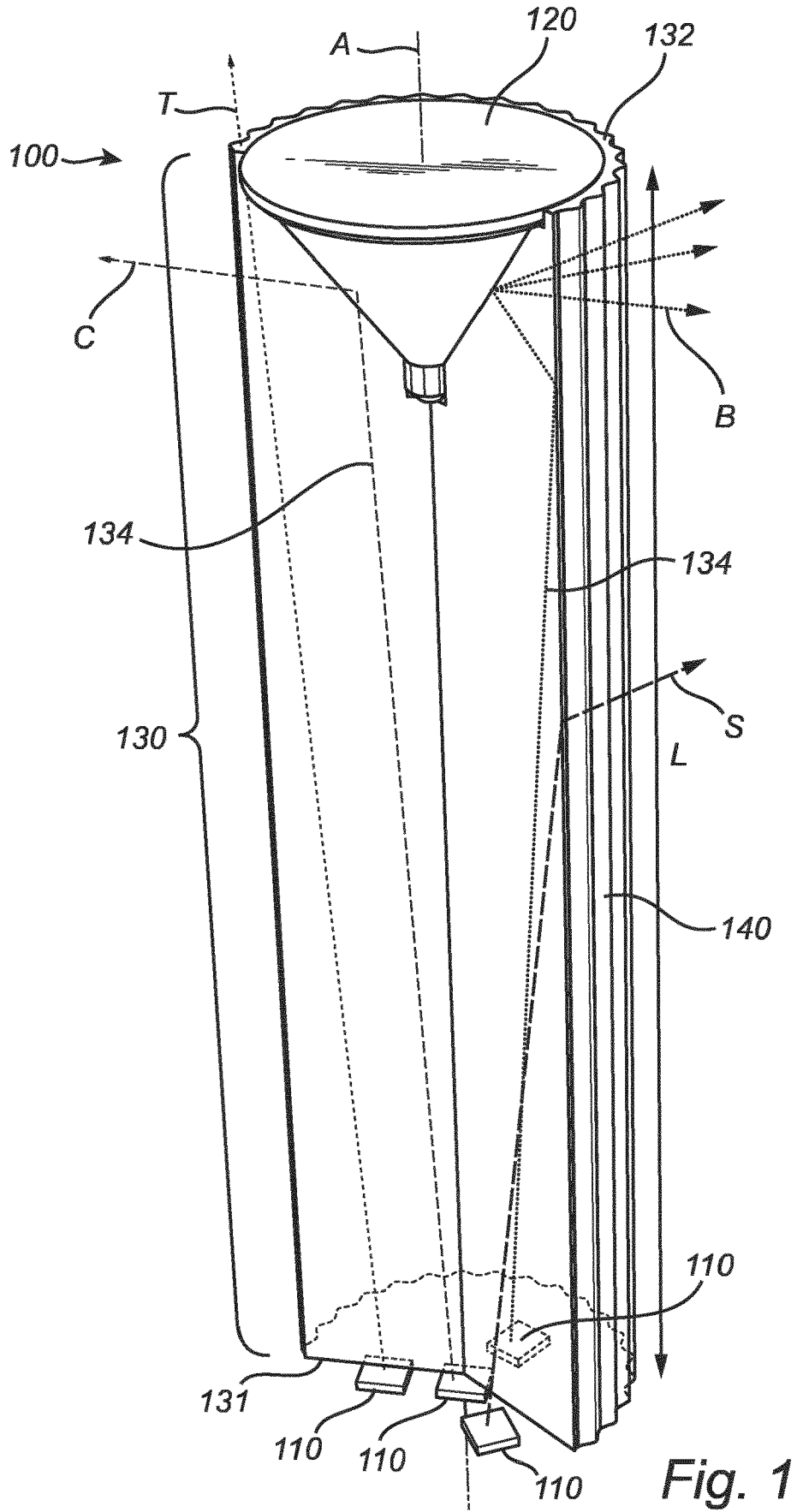
FIG. 1 schematically shows a sectional view of a portion of a lighting arrangement according to an exemplifying embodiment of the present invention, FIG. 2 schematically shows a sectional view of a portion of a lighting arrangement according to an exemplifying embodiment of the present invention, FIGS. 3a, 3b and 3c schematically show top views of a cross section of a lighting arrangement according to exemplifying embodiments of the present invention, FIG. 4 schematically shows a detailed view of a portion of the prismatic structure of a lighting arrangement comprising surface roughness according to an exemplifying embodiment of the present invention, and FIG. 5 schematically shows a view of a LED lamp comprising a lighting arrangement according to an exemplifying embodiment of the present invention.

FIG. 1 schematically shows a sectional view of a portion of a lighting arrangement 100 according to an exemplifying embodiment of the present invention. The lighting arrangement 100 comprises a LED light source 110 arranged to emit LED light. It will be appreciated that the lighting arrangement 100 may comprise substantially any number of LEDs of the LED light source 110. For example, the LEDs of the LED light source 110 may be aligned in a horizontal array. According to one alternative example, the LED light source 110 may comprise at least one first LED arranged to emit white light, wherein white light means light having a wavelength range of 400-700 nm. According to another alternative example, the LED light source 110 may comprise at least one second LED arranged to emit red light, wherein red light means light having a wavelength range of 450-495 nm. According to another alternative example, the LED light source 110 may comprise at least one third LED arranged to emit at least one of green and yellow light, wherein the green light means light having a wavelength range of 495-570 nm and the yellow light means light having a wavelength range of 570-590 nm. According to another alternative example, the LED light source 110 may comprise at least one fourth LED arranged to emit blue light, wherein blue light means light having a wavelength range of 620-750 nm. According to another alternative exam, the white light may have a correlated color temperature in a range from 2000 to 8000 K. The white light may have a color rendering index of at least 80, especially at least 85. At least one of these LEDs emitting different light may form the LED light source 110 or be combined together to form the LED light source 110.

The lighting arrangement 100 further comprises a reflector 120 arranged to reflect at least part of the light incident on it. The lighting arrangement 100 further comprises a rod-shaped light guide element 130 configured to guide light emitted from the LED light source 110. The rod-shaped light guide element 130 may be either solid or hollow. The light guide element 130 extends along a principal axis, A, and comprises a first end 131 and a second end 132. The light guide element 130 is arranged between the LED light source 110 and the reflector 120, wherein the LED light source 110 is arranged at the first end 131 and the reflector 120 is arranged at the second end 132.

According to some embodiments, when the lighting arrangement 100 is in operation, at least part of the LED light is coupled into the light guide element 130 at the first end 131 as in-coupled light and the light guide element 130 is configured to guide, based on TIR, at least a first part of the in-coupled light as guided light 134 to the second end 132, shown as B and C in FIG. 1, wherein the reflector 120 is arranged to reflect at least part of the guided light 134, shown as B in FIG. 1, incident on the reflector 120 such that the reflected light is arranged to exit the lighting arrangement 100. The lighting arrangement 100 is further arranged to output at least a second part of the in-coupled light through a side surface 140 of the light guide element 130, which is indicated by S in FIG. 1. The lighting arrangement 100 is further arranged to output at least a third part of the in-coupled light through part of the second end 132 of the light guide element 130, and finally emit this light from the top of the lighting arrangement 100, which is indicated by D in FIG. 1.

According to an alternative example, as shown in FIG. 1, the part B of the LED light as shown in FIG. 1 is reflected from the reflector 120 and output from the lighting arrangement 100 in a range from 15% to 35% of the LED light emitted from the LED light source 110, preferably 20% to 27%.

Further, according to an alternative example, the lighting arrangement 100 comprises an air gap (not shown in the drawings) between the second end 132 of the light guide element 130 and the reflector 120, as shown in FIG. 1. The part C of the LED light as shown in FIG. 1, which is reflected based on TIR at the interface between the air gap and the second end 132 of the light guide element, is in a range from 30% to 55% of the LED light, preferably 39% to 48%.

Further, according to an alternative example, as shown in FIG. 1, a part of the LED light, S, is output through the side surface of the light guide element 130 without being reflected by the reflector 120 or a recess at the second end 132. The recess at the second end 132 will be discussed in detail below in combination with FIG. 2. The part of the LED light, S, is in a range from 10% to 40% of the LED light, preferably 15% to 28%.

Because of the above disclosed specific prismatic structure of the lighting arrangement 100 with a surface roughness, a uniform light distribution with low glare and sufficient color mixing is obtained.

Figure 2:
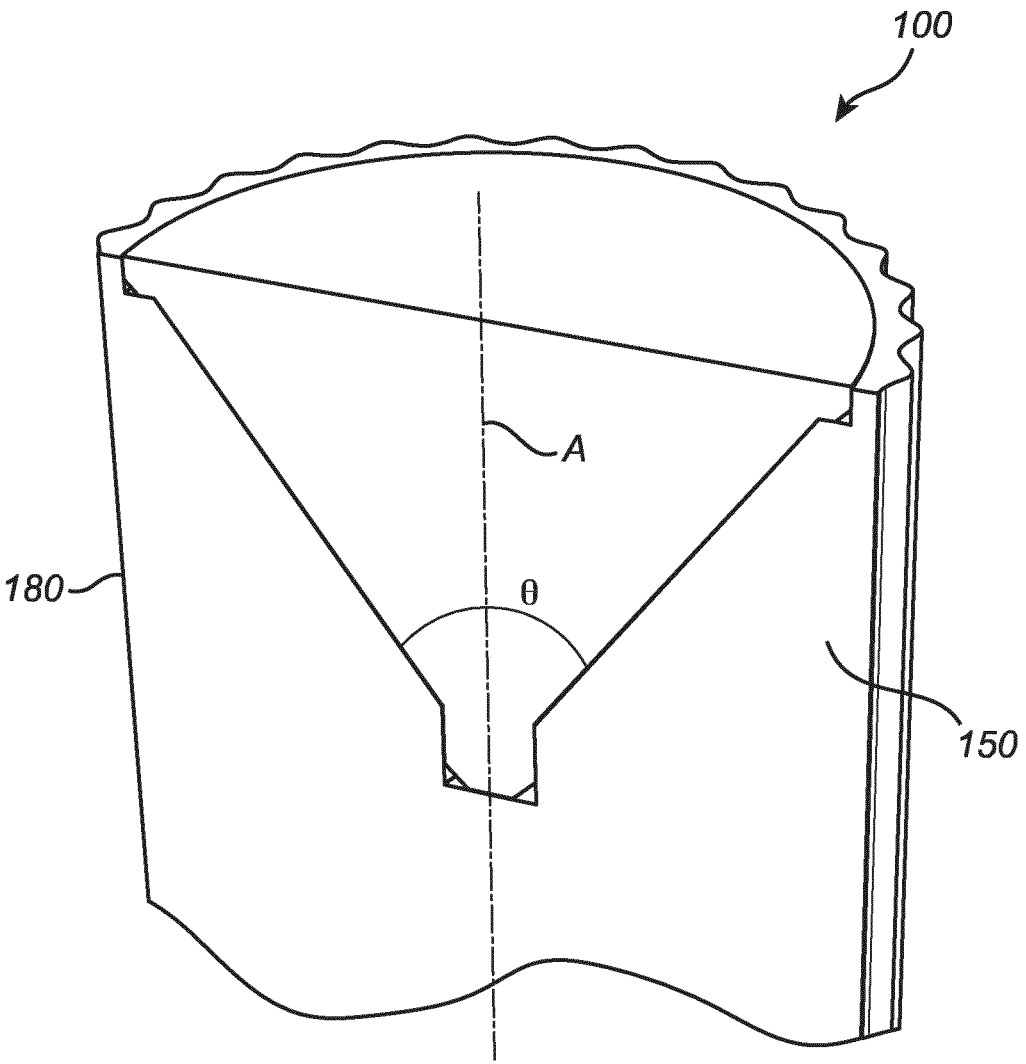
Figures 3A, 3B, 3C:
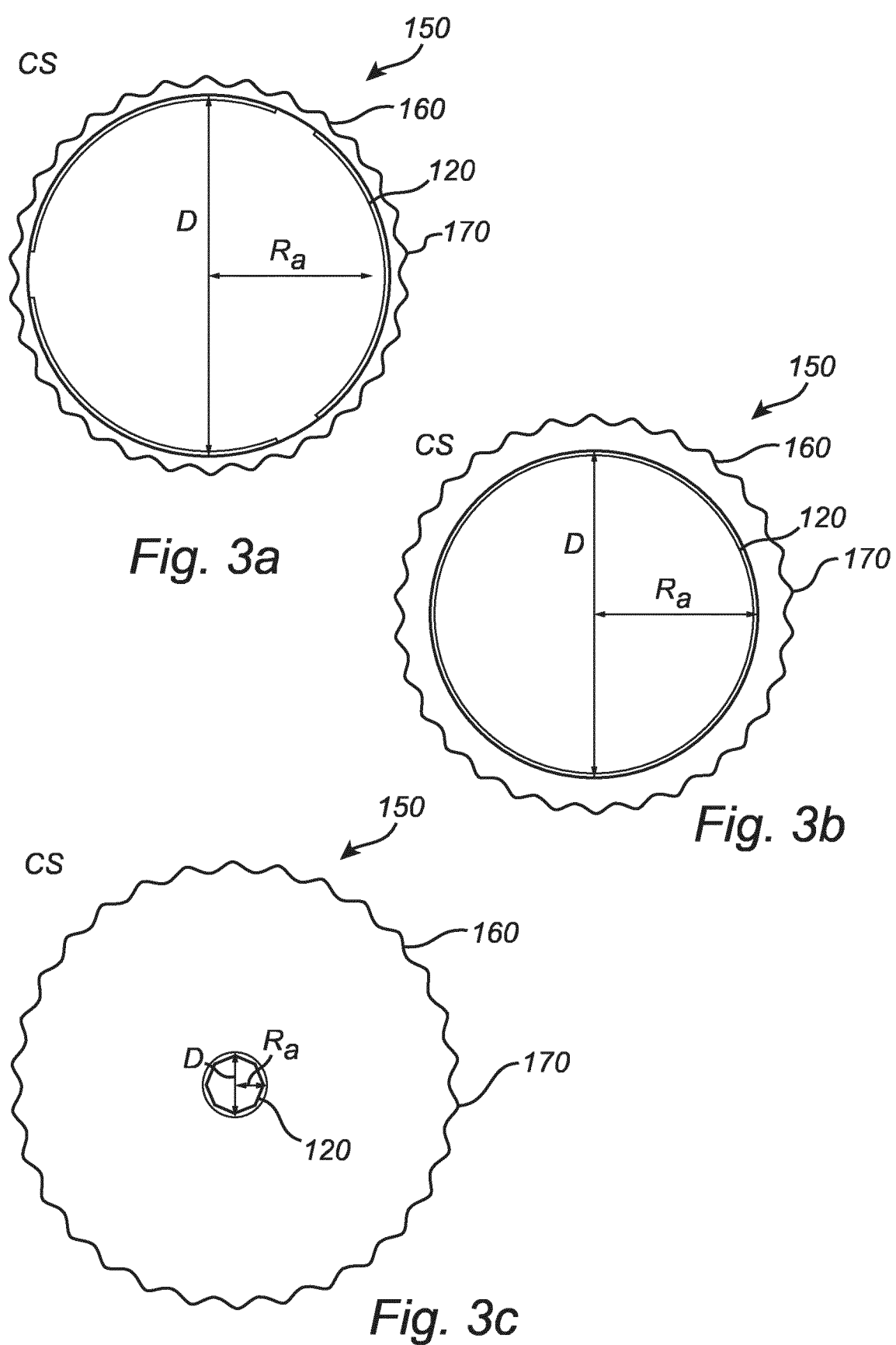

FIG. 2 schematically shows a sectional view of a portion of a lighting arrangement 100 according to an exemplifying embodiment of the present invention. To explain the structure of the lighting arrangement 100, the following content is elaborated in combination with FIGS. 1, 3a, 3b and 3c, and the references provided therein. In FIG. 2, the side surface 140 of the light guide element 130 comprises a prismatic structure 150. A cross section, CS, of the prismatic structure 150 is perpendicular to the principal axis, A. According to an alternative example, as shown in FIG. 2 in combination with FIGS. 1, 3a, 3b and 3c, the light guide element 130 comprises a recess at the second end towards the first end. The reflector 120 may be conical, as shown in FIGS. 3a and 3b, or multifaceted, as shown in FIG. 3c, and is arranged to be recessed at least partly into the recess. According to another alternative example, the reflector 120 is conical and has an apex angle, $\theta$, in a range from 65° to 85°, preferably in a range from 70° to 80°, and more preferably 72°.

FIGS. 3a, 3b and 3c schematically show top views of a cross section of a lighting arrangement 100 according to exemplifying embodiments of the present invention. To explain the prismatic structure 150 in detail, the following content is elaborated in combination with FIGS. 1 and 2, and the references provided therein. As shown in FIGS. 3a-3c, the prismatic structure 150 comprises a saw-tooth profile 160 around a circumference of the light guide element 130. The saw-tooth profile 160 comprises at least 10 vertices 170, preferably 20-60 vertices 170. The vertices 170 extend in a radial direction, $R_a$, of the light guide element 130 and define edges 180 of the prismatic structure 150. The edges 180 extend parallel to the principal axis, A.

As shown in FIG. 3a, in some embodiments, the reflector 120 may be conical and covers only part of the second end 132 of the light guide element 130. In such case, the reflector 120 may be translucent or non-light transmissive, at least part of the second end 132 of the light guide element 130 is not covered by the reflector 120, whereby the part T of the LED light as shown in FIG. 1 is output from the part of the second end 132 of the light guide element 130 which is not covered by the reflector 120. In some preferred examples, the part T of the light is in a range from 8% to 20%, preferably 11% to 15%. A further embodiment of the reflector 120 is shown in FIG. 3b, the reflector 120 may be also conical but covers the whole part of the second end 132 of the light guide element 130. In such case, the reflector 120 may be arranged to be translucent so that the part T of the LED light emitted from the LED light source 110 is output from the second end 132 of the light guide element 130 via the reflector 120. In some preferred examples, the part T of the light is in a range from 8% to 20%, preferably 11% to 15%. A third embodiment of the reflector 120 is shown in FIG. 3c, the reflector 120 may be multifaceted and the reflector 120 may be arranged to be translucent so that the part T of the LED light emitted from the LED light source 110 is output from the second end 132 of the light guide element 130 via the reflector 120. In some preferred examples, the part T of the light is in a range from 8% to 20%, preferably 11% to 15%.

The special prismatic structure 150 described above provides a higher extent of TIR in the light guide element 130 to improve light mixing. According to some embodiments of the present invention, the prismatic structure 150 may further have rounded edges 180 to improve the manufacturability of the light guide element 130. To further improve the effect of color mixing, in some embodiments, a length, L, of the light guide element 130 along the principal axis, A, and a diameter, D, of the cross section, CS, may have a ratio, R, which fulfills $R=L/D \geq 4$, especially $15 \geq L/D \geq 4$. The length, L, may be defined according to the specific application situations. In some alternative examples, the length, L, is in a range from 4 to 12 cm.

Figure 4:
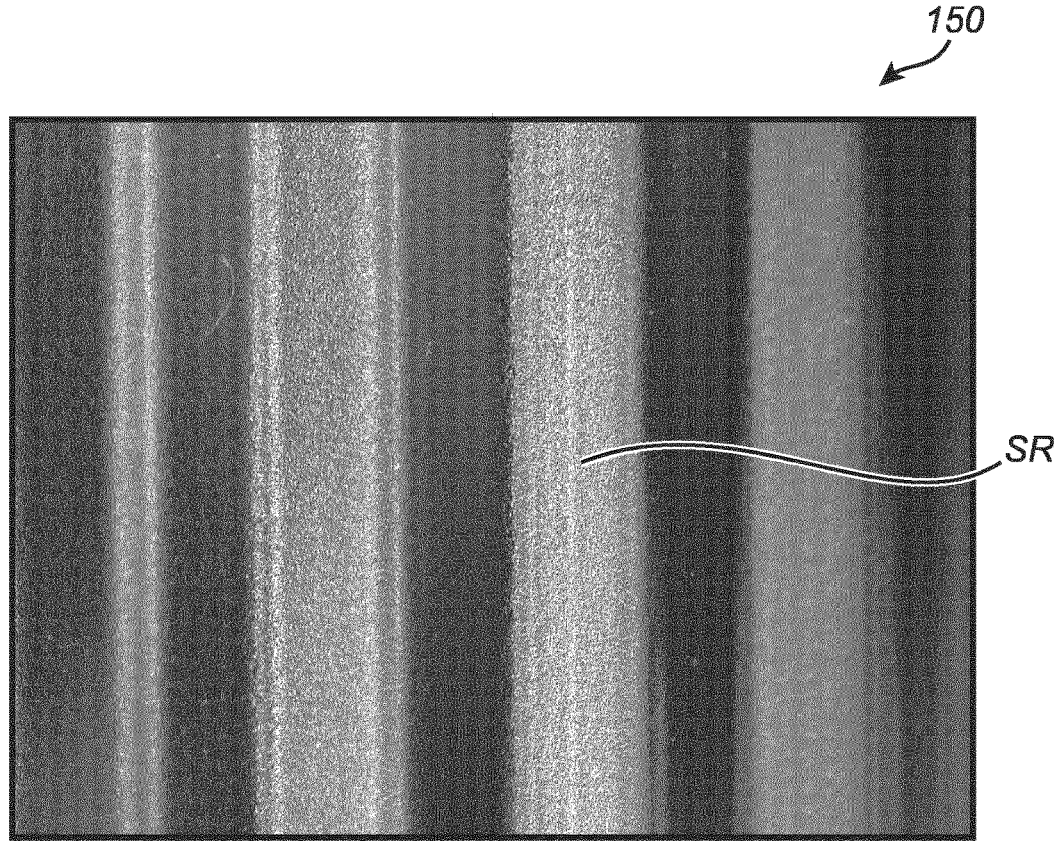

FIG. 4 schematically shows a detailed view of a portion of the prismatic structure of a lighting arrangement 100 comprising a surface roughness, SR, according to an exemplifying embodiment of the present invention. To provide a filament-kind of appearance, the prismatic structure 150 comprises a surface roughness, SR, as shown in FIG. 4. In some embodiments, the surface roughness, SR, has a roughness average value in the range from 0.16 to 0.64 μm, preferably in the range from 0.3 to 0.5 μm. Since the surface roughness disrupts the TIR of part of the light source light coupled into and transported via TIR through the light guide element, the filament-kind of appearance is obtained.

Figure 5:
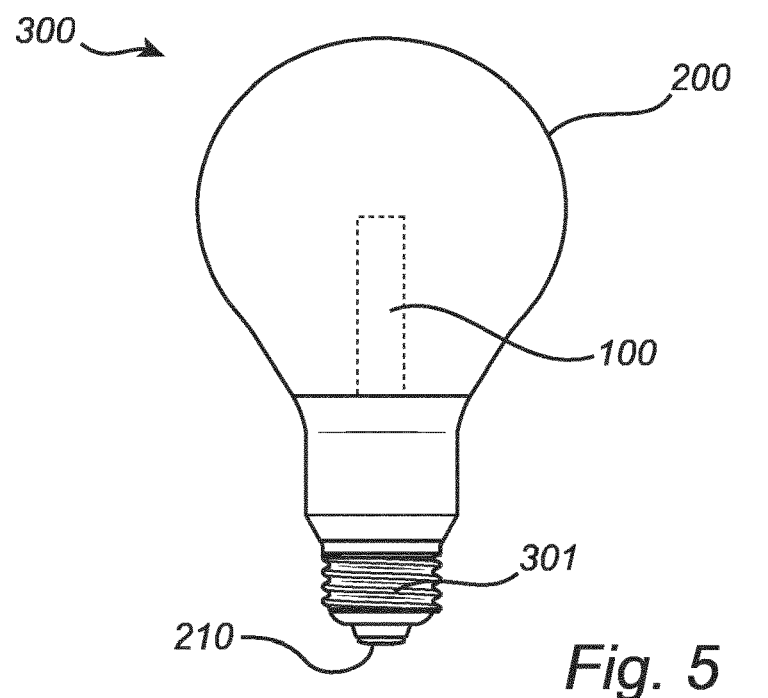

FIG. 5 schematically shows a view of a LED lamp 300 comprising a lighting arrangement 100 according to an exemplifying embodiment of the present invention. According to the example of FIG. 5, the LED lamp 300 comprises an envelope 200 at least partly enclosing the lighting arrangement according to an exemplifying embodiment of the present invention, and a base 301 wherein the base comprises a cap 210 arranged to mechanically and electrically connect the lighting arrangement to a socket of a luminaire.

The person skilled in the art realizes that the present invention by no means is limited to the preferred embodiments described above. On the contrary, many modifications and variations are possible within the scope of the appended claims. For example, one or more of the components of the lighting arrangement 100, such as the light guide element 130, the reflector 120, etc., may have different shapes, dimensions and/or sizes than those depicted/described.

The invention claimed is:

1. A lighting arrangement, comprising:
a rod-shaped light guide element defining a longitudinal axis, the light guide element having a first end, a second end having a recess projecting towards the first end, and a side surface having a prismatic structure with a saw-tooth profile on a cross section perpendicular to the longitudinal axis and extending around a circumference of the light guide element, the prismatic structure having at least 10 vertices extending in a radial direction of the light guide element, the at least 10 vertices defining edges extending parallel to the longitudinal axis with a surface roughness of the prismatic structure having an average value in the range from 0.16 μm to 0.64 μm;
a light emitting diode (LED) light source arranged at the first end of the light guide element and configured to emit light; and
a conical reflector provided at least partially within the recess of the second end of the light guide element;

wherein at least part of the light emitted by the LED light source is coupled into the light guide element at the first end, and the light is guided by total internal reflection (TIR) to the second end and reflected by the reflector to exit the lighting arrangement.

2. The lighting arrangement according to claim 1, wherein a ratio of a length of the light guide element and a diameter of the cross section is greater than or equal to 4.

3. The lighting arrangement according to claim 1, wherein the edges of the prismatic structure are rounded.

4. The lighting arrangement according to claim 1, wherein an apex angle of the conical reflector is in a range from 65° to 85°.

5. The lighting arrangement according to claim 1, wherein the number of vertices is in a range from 20 to 60.

6. The lighting arrangement according to claim 1, wherein at least part of the second end of the light guide element is not covered by the reflector such that a range from 8% to 20% of light is output from the part of the second end of the light guide element that is not covered by the reflector.

7. The lighting arrangement according to claim 1, wherein a portion of the light reflected from the reflector and output from the lighting arrangement is in a range from 15% to 35% of the light emitted by the LED light source.

8. The lighting arrangement according to claim 1, further comprising an air gap formed between the second end of the light guide element and the reflector such that the portion of light reflected by TIR at the interface between the air gap and the second end of the light guide element is in a range from 30% to 55% of the light emitted by the LED light source.

9. The lighting arrangement according to claim 1, wherein the LED light source comprises at least one first LED configured to emit white light, at least one second LED configured to emit red light, at least one third LED configured to emit at least one of green and yellow light, and at least one fourth LED configured to emit blue light.

10. An LED lamp, comprising:
a lighting arrangement according to claim 1;
an envelope at least partially enclosing the lighting arrangement; and
a base having a cap configured to mechanically and electrically connect the lighting arrangement to a luminaire socket.

11. The lighting arrangement according to claim 1, wherein the lighting arrangement is configured to output 10% to 40% of the light emitted by the LED light source through the side surface of the light guide element without being reflected by either the reflector or the recess.

12. The lighting arrangement according to claim 11, wherein the lighting arrangement is configured to output 15%-28% of the light emitted by the LED light source through the side surface of the light guide element without being reflected by either the reflector or the recess.

* * * * *